US012638006B2

(12) United States Patent
Bernardez Piñeiro et al.

(10) Patent No.: US 12,638,006 B2
(45) Date of Patent: May 26, 2026

(54) JIB CRANE FOR A WIND TURBINE, JIB CRANE KIT, TRANSPORT SYSTEM AND MAINTENANCE SYSTEM AS WELL AS METHODS

(71) Applicant: Nordex Energy Spain S.A.U., Barásoain (ES)

(72) Inventors: Ramon Bernardez Piñeiro, Barasoain (ES); Xabier Martinez de Narvajas Pastor, Barasoain (ES)

(73) Assignee: Nordex Energy Spain S.A.U., Barasoain (ES)

( * ) Notice: Subject to any disclaimer, the term of this patent is extended or adjusted under 35 U.S.C. 154(b) by 0 days.

(21) Appl. No.: 18/844,009

(22) PCT Filed: Mar. 4, 2022

(86) PCT No.: PCT/ES2022/070127
§ 371 (c)(1),
(2) Date: Sep. 4, 2024

(87) PCT Pub. No.: WO2023/166231
PCT Pub. Date: Sep. 7, 2023

(65) Prior Publication Data
US 2025/0188910 A1 Jun. 12, 2025

(51) Int. Cl.
F03D 80/50 (2016.01)
B66C 23/20 (2006.01)
(Continued)

(52) U.S. Cl.
CPC ............ F03D 80/50 (2016.05); B66C 23/207 (2013.01); F03D 13/116 (2023.08);
(Continued)

(58) Field of Classification Search
CPC .... B66C 23/207; F03D 80/50; F05B 2230/61; F05B 2240/916
See application file for complete search history.

(56) References Cited

U.S. PATENT DOCUMENTS 7,377,740 B2 * 5/2008 Panzarella ............ B60P 1/5433
212/180
8,250,758 B2 * 8/2012 Daniels ................. B66C 23/207
29/889.1
(Continued)

FOREIGN PATENT DOCUMENTS

CN 108216862 A 6/2018
DE 200 10 042 U1 11/2000
(Continued)

OTHER PUBLICATIONS

International Search Report of the European Patent Office dated Feb. 21, 2023 for international application PCT/ES2022/070127 on which this application is based.
(Continued)

*Primary Examiner* — Justin D Seabe
(74) *Attorney, Agent, or Firm* — Walter Ottesen, P.A.

(57) ABSTRACT

A modular jib crane for a nacelle for a wind turbine includes: a base element for attaching the crane to the nacelle, a pillar, wherein the pillar is coupleable with the base element at a first end of the pillar, and a first crane arm, wherein the first crane arm is coupleable with the pillar at a first end of the first crane arm, wherein at least one of the pillar and the first crane arm includes a plurality of modules coupleable with each other to form the pillar or first crane arm.

8 Claims, 11 Drawing Sheets

(51) Int. Cl.
  _F03D 13/10_    (2016.01)
  _F03D 13/40_    (2016.01)
(52) U.S. Cl.
  CPC ........ _F03D 13/403_ (2023.08); _F05B 2230/61_
      (2013.01); _F05B 2260/02_ (2013.01)

(56)        References Cited

U.S. PATENT DOCUMENTS

| | | | | |
|---|---|---|---|---|
| 9,404,559 | B2 | 8/2016 | Van Buchan et al. | |
| 9,428,369 | B2 * | 8/2016 | Tieke | F03D 80/50 |
| 9,651,020 | B2 * | 5/2017 | Holloway | B66C 23/207 |
| 10,190,577 | B1 | 1/2019 | Manikas et al. | |
| 10,865,076 | B1 * | 12/2020 | Schrank | B66C 23/166 |
| 11,168,671 | B2 * | 11/2021 | Aitken | F03D 80/50 |
| 2010/0011575 | A1 | 1/2010 | Numajiri | |
| 2018/0313334 | A1 | 11/2018 | Manikas et al. | |

FOREIGN PATENT DOCUMENTS

| | | |
|---|---|---|
| EP | 2 147 885 A1 | 1/2010 |
| EP | 2 835 335 A1 | 2/2015 |
| EP | 2 865 891 A1 | 4/2015 |
| WO | 2019/040342 A1 | 2/2019 |
| WO | 2019/100146 A1 | 5/2019 |
| WO | 2019/123145 A1 | 6/2019 |

OTHER PUBLICATIONS

Written Opinion of the International Searching Authority dated Feb. 21, 2023 for international application PCT/ES2022/070127 on which this application is based.

* cited by examiner

JIB CRANE FOR A WIND TURBINE, JIB CRANE KIT, TRANSPORT SYSTEM AND MAINTENANCE SYSTEM AS WELL AS METHODS

CROSS-REFERENCE TO RELATED APPLICATIONS

This application is a continuation application of international patent application no. PCT/ES2022/070127, filed Mar. 4, 2022, designating the United States and the entire content is incorporated herein by reference.

TECHNICAL FIELD

The disclosure relates to a modular jib crane for a nacelle of a wind turbine. The disclosure further relates to a modular jib crane kit for assembling a modular jib crane. The disclosure further relates to a transport system for a modular jib crane. The disclosure further relates to a nacelle for a wind turbine, in particular a nacelle which includes a modular jib crane. The disclosure further relates to a method for installing a modular jib crane. The disclosure further relates to a maintenance system for a nacelle for a wind turbine. The disclosure further relates to a method for maintenance of a nacelle for a wind turbine. The disclosure further relates to a method for installing a maintenance system.

BACKGROUND

A wind turbine may include a rotor that includes a rotatable rotor hub assembly having multiple rotor blades. The rotor blades transform wind energy into a drive torque that drives a generator via a drive train. For installation and maintenance operations, components of the drive train and other components of the wind turbine need to be lifted to the nacelle or lowered from the nacelle to the ground.

SUMMARY

It is an object of the disclosure to provide a modular jib crane for a nacelle for a wind turbine that enables reliable operation. It is a further object of the disclosure to provide a modular jib crane kit that enables a wide ranging use. It is a further object of the disclosure to provide a transport system for a modular jib crane that enables a simple operation. It is a further object of the disclosure to provide a nacelle with a jib crane that allows effective installation and maintenance. It is a further object of the disclosure to provide a method for installing a modular jib crane that allows a multi-purpose use. It is a further object of the disclosure to provide a maintenance system for a nacelle that enables reliable operation. It is a further object of the disclosure to provide methods for maintenance of a nacelle and for installing a maintenance system that enable a wide ranging use.

Embodiments of the disclosure provide a modular jib crane for a nacelle for a wind turbine. Further embodiments of the disclosure provide a modular jib crane kit for assembling a modular jib crane, in particular a modular jib crane described herein. Further embodiments of the disclosure provide a transport system for a modular jib crane, in particular a modular jib crane according to embodiments described herein. Embodiments of the disclosure provide a nacelle for a wind turbine, in particular a nacelle with a modular jib crane described herein. Further embodiments of the disclosure provide a method for installing a modular jib crane, in particular a modular jib crane as described herein. Further embodiments of the disclosure provide a maintenance system for a nacelle for a wind turbine. Further embodiments of the disclosure provide a method for maintenance of a nacelle for a wind turbine, in particular a method which uses a maintenance system as described herein. Further embodiments of the disclosure provide a method for installing a maintenance system, in particular a maintenance system as disclosed herein. Further embodiments of the disclosure provide combinations of the above embodiments.

According to embodiments the modular jib crane for a nacelle for a wind turbine includes:
- a base element for attaching the crane to the nacelle,
- a pillar, wherein the pillar is coupleable with the base element at a first end of the pillar, and
- a first crane arm, wherein the first crane arm is coupleable with the pillar at a first end of the first crane arm,
- wherein at least one of the pillar and the first crane arm includes a plurality of modules coupleable with each other to form the pillar or first crane arm.

The modular jib crane is configured to be used as a service crane in the nacelle. For example the modular jib crane is configured to move components within the nacelle. The components to be moved by the crane may for example be a gearbox low-speed shaft, a gearbox intermediate-speed shaft, a gearbox high-speed shaft, a yaw gear drive or any other component whose weight does not exceed the load capacity of the crane. The crane is segmented into the modules. This enables a customization of the crane depending on the space available within the nacelle and on the necessary reach of the crane within the nacelle. Furthermore, this improves flexibility in the transportation of the crane and enables the crane to be transported in a space-efficient manner. Additionally, this enables an easy installation of the crane.

According to further embodiments the jib crane includes a first pivot joint. The first pivot joint can be coupled with the pillar at a second end of the pillar. The first crane arm can be coupled with the pillar at the first end of the first crane arm via the first pivot joint. This allows that the first crane arm is pivotable relative to the pillar in a coupled state. The pivot joint between the pillar and the first crane arm allows a flexible movement of the crane arm to reach different regions within the nacelle. The first pivot and the first crane arm may be two separate entities which can be coupled with one another. Alternatively, the first pivot may be integrated in the first crane arm or in one of the first crane arm modules.

According to a further embodiment, the modular jib crane includes a second pivot joint. The second pivot joint can be coupled with the first crane arm at a second end of the first crane arm. The jib crane includes a second crane arm. The second crane arm can be coupled with the first crane arm at a first end of the second crane arm via the second pivot joint. This allows that the second crane arm is pivotable relative to the first crane arm in a coupled state. At least one of the pillar, the first crane arm and the second crane arm includes a plurality of modules that can be coupled with each other to form that pillar, first crane arm or second crane arm. The modular jib crane can be customized to fit the nacelle and to have the necessary reach within the nacelle. Furthermore, the crane is able to move in a flexible and efficient manner within the nacelle due to the two crane arms which are pivotable with respect to each other.

According to a further embodiment, at least one of the pillar, the first crane arm and the second crane arm is formed by modules of the same kind. In particular, the pillar is formed by modules of a first kind, the first crane arm is formed by modules of a second kind and/or the second crane arm is formed by modules of a third kind, wherein the first kind, second kind and/or third kind may be the same or different. Modules of the same kind correspond for example to substantially identical modules. Alternatively, modules of the same kind correspond for example to modules having the same geometry, for example, tubular with the same cross-section, but a different length in their longitudinal dimension. Alternatively or additionally, modules of the same kind for example correspond to modules that are identical or have the same geometry but differ in the presence or absence of a coupling interface at each of their extremities. The fact of having modules of the same kind facilitates the manufacture and the handling of the modules. Thus, a cost effective modular jib crane can be realized.

According to a further embodiment, the first pivot joint and/or the second pivot joint are/is rotatable with respect to a planar surface whose normal direction is aligned with a longitudinal axis of the pillar. Thus, the flexible and effective movement of the crane arms can be realized and different regions within the nacelle are reachable.

According to a further embodiment, the base element is configured to be attached to a support structure inside the nacelle. The support structure may be configured to support components arranged inside the nacelle. For example, the support structure includes a machine frame configured to support drive train components such as the rotor bearing arrangement and/or the gearbox. According to further embodiments the support structure alternatively or in addition includes a generator frame configured to support the generator and other electrical components. The support structure may include any other type of support structure depending on the drive train concept or on the nacelle type and configuration. The base element, for example, is tailor made to match the specific type and configuration of the nacelle and in particular the support structure on which it will be fixed. Thus, the modules for the pillar and the crane arms can be used in different types and configurations of the nacelle without customization of those modules, and the base element serves as an interface between the pillar and the support structure.

According to an embodiment a modular jib crane kit includes:

a multitude of base elements, wherein each base element of the multitude of base elements is configured to mate with a different type of nacelle, a plurality of pillar modules to form different types of the pillar dependent on the type of the nacelle, a plurality of first crane arm modules and/or a plurality of second arm modules to form different types of the first crane arm and/or of the second arm dependent on the type of nacelle.

In particular the modular jib crane kit allows an assembling of a modular jib crane according to embodiments of this disclosure. The jib crane kit includes different base elements and modules such that different kinds of jib cranes can be assembled depending on the type and configuration of the nacelle and/or type of component to be moved by the jib crane.

The modular jib crane kit includes a plurality of different connection elements. The connection elements can each be coupled with a type of component to be connected to and moved by the. The connection elements can each be coupled with the first crane arm at the second end of the first crane arm and/or with the second crane arm at a second end of the second crane arm. Thus, the crane can be assembled to match different needs, and thereby a flexible application and use is realized.

According to further embodiments, the modular jib crane kit includes an add-on crane. The add-on crane can be coupled with the pillar. The add-on crane is configured to move at least one of the pillar modules. Alternatively or in addition the add-on crane is configured to move the first crane arm modules. Alternatively or in addition the add-on crane is configured to move the second crane arm modules during assembly of the crane. Thus, the add-on crane is configured to move parts of the add-on crane to assist during assembly or disassembly of the crane.

According to embodiments, a transport system for a modular jib crane includes a single basket. The single basket is configured to carry the modules of the crane. In particular, the modular jib crane is a modular jib crane according to embodiments described herein. The single basket may be configured such that the modules can be stored within the basket in a disassembled state. Alternatively or in addition, the single basket may be configured such that it can accommodate modules which are already pre-assembled with one or more other modules or with another crane part. For example, the basket is used for storage and transportation. The modules of the pillar and the crane arms as well as, for example, the first pivot joint, the second pivot joint, the connection element, the add-on crane and/or the base element can be stored together in one single basket. In addition, a crane hoist may also be stored in the single basket. With the single basket, only one single hoisting is needed to lift the modular jib crane to the nacelle or lower the modular jib crane to the ground. Thus, transport and storage of the modular jib crane is easy and cost-effective.

According to an embodiment, a nacelle for a wind turbine includes a modular jib crane, in particular a modular jib crane according to embodiments described herein. The base element of the jib crane is fixed to a support structure inside the nacelle. With the jib crane, components can be moved inside the nacelle. The jib crane can be used in different types of nacelles due to its modular construction and modular configuration.

According to embodiments, a method for installing a modular jib crane includes lifting a transport system and unpacking the basket as well as assembling the modules of the crane. For example, the jib crane is a jib crane according to embodiments described herein. For example, the transport system is a transport system according to embodiments described herein. The crane is packed in an unassembled state or partly unassembled state during the lifting. Inside the nacelle the modules of the crane are unpacked and the crane is assembled inside the nacelle.

According to an embodiment, a high-capacity hoist is lifted to the nacelle. The high-capacity hoist is lifted with an on-board hoist prior to lifting the transport system. The high-capacity hoist includes a higher weight capacity than the on-board hoist. The high-capacity hoist is coupled with the nacelle and lifts the transport system to the nacelle. Thus, the basket with the heavy weight can be lifted reliably to the nacelle even if the on-board hoist has not enough weight capacity. The on-board hoist has a weight capacity that at least allows lifting of the high-capacity hoist. The on-board hoist corresponds for example to a hoist which is permanently installed inside the nacelle.

According to an embodiment, a maintenance system for a nacelle for a wind turbine includes a crane. The crane can be a crane according to embodiments described herein. The crane can also be a different crane that differs from the embodiments of the jib crane described herein. The crane is configured to carry and to move a component inside the nacelle. The maintenance system includes a high-capacity hoist. The high-capacity hoist is configured to move the component through a nacelle opening along a tower of the wind turbine. The maintenance system includes a carrying system. The carrying system is configured to carry and to move the component between a region of the nacelle in which the crane is located and a region of the nacelle including the nacelle opening. With the high-capacity hoist the component is movable along a vertical direction between the ground and the nacelle. With the carrying system, the component is movable along a horizontal direction within the nacelle. The crane allows a flexible movement of the component between its intended position and the carrying system.

According to further embodiments, the carrying system includes a rail system. Alternatively or in addition the carrying system includes a nacelle trolley. The rail system is coupled to the high-capacity hoist and connectable to the component via the high-capacity hoist in order to carry and move the component. For example, the rail system is fixed to the nacelle and the high-capacity hoist is connected to the rail system such that the high-capacity hoist is movable relative to the rail system and supported by the rail system. In use, the nacelle trolley is located on a floor of the nacelle and configured to carry and move the component. For example, the nacelle trolley includes wheels and a board to carry and move the component. The nacelle trolley may for example be moved freely on the floor of the nacelle. Alternatively, the nacelle trolley may for example be moved along a rail arranged on the floor of the nacelle and guiding the nacelle trolley along a predefined trajectory within the nacelle.

According to further embodiments, the carrying system includes the rail system and the rail system includes a rail beam. The rail beam is connected to a nacelle housing support structure of the nacelle. The rail system includes a rail trolley movable along the rail beam. The rail trolley is in particular supported at the rail beam. The high-capacity hoist is coupled to the rail trolley such that the high-capacity hoist is movable along the rail beam. Thus, the high-capacity hoist is movable between the region of the nacelle including the nacelle opening and the region of the nacelle in which the crane is located by moving along the rail beam.

According to an embodiment a method for maintenance of a nacelle for a wind turbine includes:
  moving a component with the crane,
  transferring the component between the crane and the carrying system,
  moving the component with the carrying system between the region of the nacelle in which the crane is located and the region of the nacelle including the nacelle opening,
  operating the high-capacity hoist in order to move the component through the nacelle opening along the tower of the wind turbine.

In particular, the method uses a maintenance system according to embodiments described herein.

According to embodiments, the method includes:
  moving the component inside the nacelle with the crane to the carrying system,
  transferring the component from the crane to the carrying system by coupling the component with the carrying system and by decoupling the component from the crane,
  moving the component towards the nacelle opening, operating the high-capacity hoist in order to lower the component through the nacelle opening along the tower of the wind turbine to the ground.

In particular, the component may be directly transferred from the crane to the carrying system by coupling the component with the carrying system and by decoupling the component from the crane, such that the component does not need to be placed on the floor of the nacelle at any time. In case the component is initially coupled with the crane via a load lifting tool, the transfer operation may include coupling the load lifting tool with the carrying system and decoupling the load lifting tool from the crane. The component thus remains coupled with the load lifting tool.

In an alternative embodiment, before transferring the component to the carrying system, the component may first be placed on the floor of the nacelle in order to decouple the component from the load lifting tool. In this alternative embodiment, the component may then be coupled again with the crane (this time without the load lifting tool there between) and moved further to the carrying system for conducting the transfer operation. In some embodiments, one or more auxiliary hoists attached to the nacelle housing support structure may be used to help carry the component during the transfer operation.

According to a further embodiment the method includes:
  operating the high-capacity hoist in order to lift the component along the tower of the wind turbine through the nacelle opening,
  moving the component towards the crane with the carrying system,
  transferring the component from the carrying system to the crane by coupling the component with the crane and by decoupling the component from the carrying system,
  moving the component inside the nacelle with the crane to an intended place of operation.

In particular, the component may be transferred from the carrying system to the crane and then directly moved inside the nacelle to the intended place of operation by the crane, such that the component does not need to be placed on the floor of the nacelle at any time. In case the component is initially coupled with the carrying system via a load lifting tool, the transfer operation may include coupling the load lifting tool with the crane and decoupling the load lifting tool from the carrying system. In an alternative embodiment, the component may be initially coupled with the carrying system without the load lifting tool there between. In this alternative embodiment, after transferring the component to the crane, the component may be placed on the floor of the nacelle in order to couple the component with the load lifting tool. The component may then be coupled again with the crane (this time with the load lifting tool there between) and moved further to the intended place of operation. In some embodiments, one or more auxiliary hoists attached to the nacelle housing support structure may be used to help carry the component during the transfer operation.

The method can be used to lift and/or to lower the component along the tower between the nacelle and the ground. Inside the nacelle the component is transferred between the crane and the nacelle opening by the carrying system.

According to embodiments a method for installing a maintenance system includes:
  providing a carrying system inside the nacelle,
  lifting a high-capacity hoist to the nacelle with an on-board hoist, wherein the high-capacity hoist includes a higher weight capacity than the on-board hoist, lifting the crane in a disassembled state to the nacelle with the high-capacity hoist, assembling the crane inside the nacelle.

According to embodiments, the maintenance system is a maintenance system according to embodiments described herein.

According to embodiments, the carrying system or parts of the carrying system are lifted to the nacelle with the on-board hoist and/or the high-capacity hoist. The carrying system is assembled inside the nacelle. For example, the nacelle trolley is moved with the on-board hoist between the nacelle and the ground. Alternatively or in addition, parts of the rail system or the rail system is moved with one of the hoists between the nacelle and the ground.

The methods according to the different embodiments and also the systems, the modular jib crane and the modular jib crane kit according to the different embodiments can be used together. It is also possible to use only one of the embodiments separately from the other embodiments or only part of the embodiments separately from the other embodiments. The respective methods can be carried out in the order described above or in a different order of the method steps.

BRIEF DESCRIPTION OF DRAWINGS

The invention will now be described with reference to the drawings wherein.

DETAILED DESCRIPTION

Figure 1:
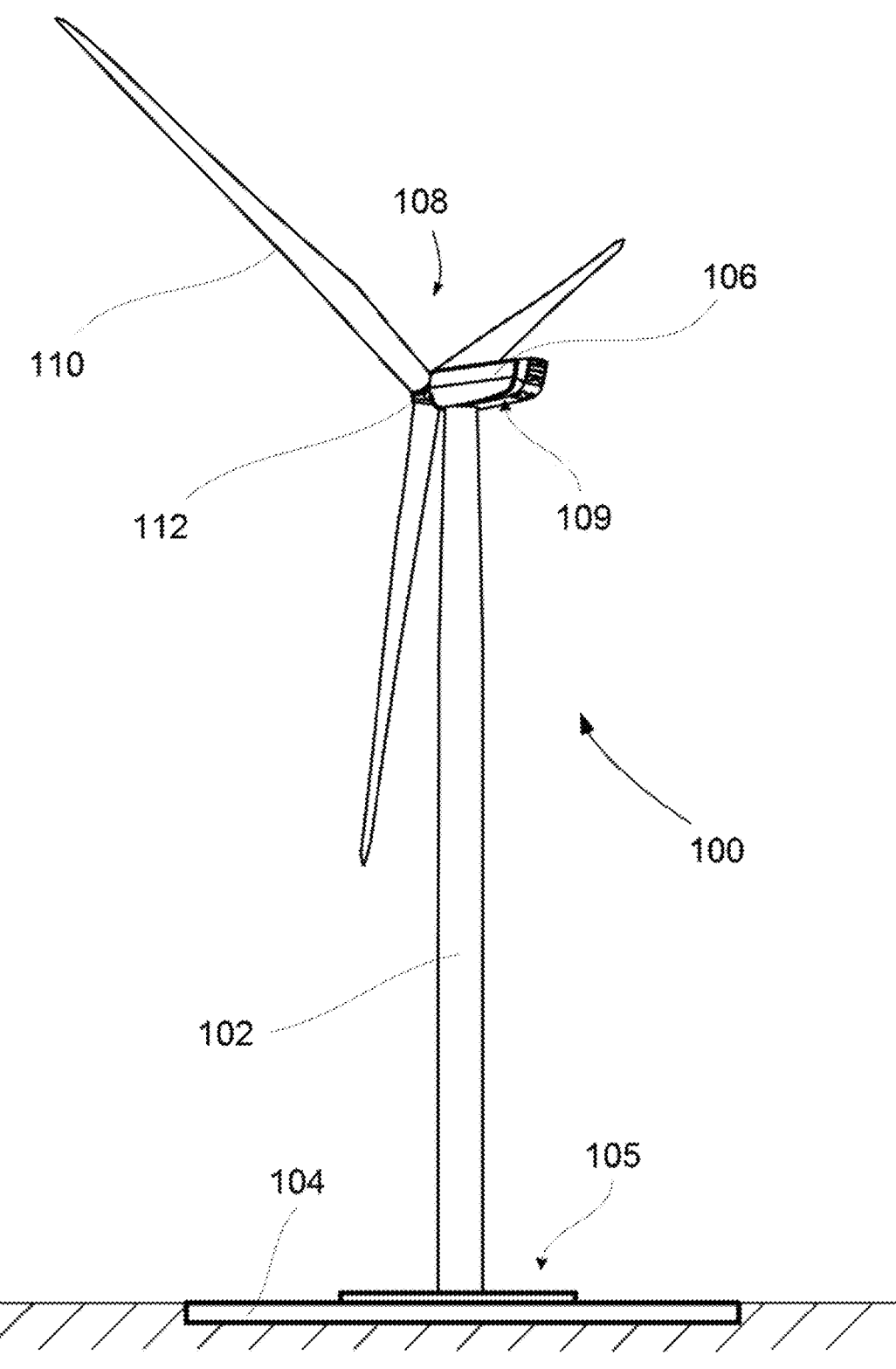
FIG. 1 is a schematic view of a wind turbine according to an embodiment.

As shown in FIG. 1 the wind turbine 100 includes a tower 102. The tower 102 is connected to a foundation 104 fixed on a ground 105. The foundation 104 is formed on and supported by the ground 105. For example roads and access routes for vehicles are formed on the ground 105. On a top end of the tower 102 opposite to the foundation 104 a nacelle 106 is arranged. The nacelle 106 houses the drive train. Inside the nacelle 106 for example a generator is arranged which is connected via a drive train including a gearbox and a rotor shaft with a rotor 108. The rotor 108 includes several rotor blades 110. The rotor blades 110 are mounted on a rotor hub 112. The rotor hub 112 is connected to the rotor shaft.

The rotor 108 is driven in operation by an air flow, for example wind. The rotational movement of the rotor 108 is transmitted via the drive train to the generator. The generator converts the energy of the rotor 108 into electrical energy.

Figure 11:
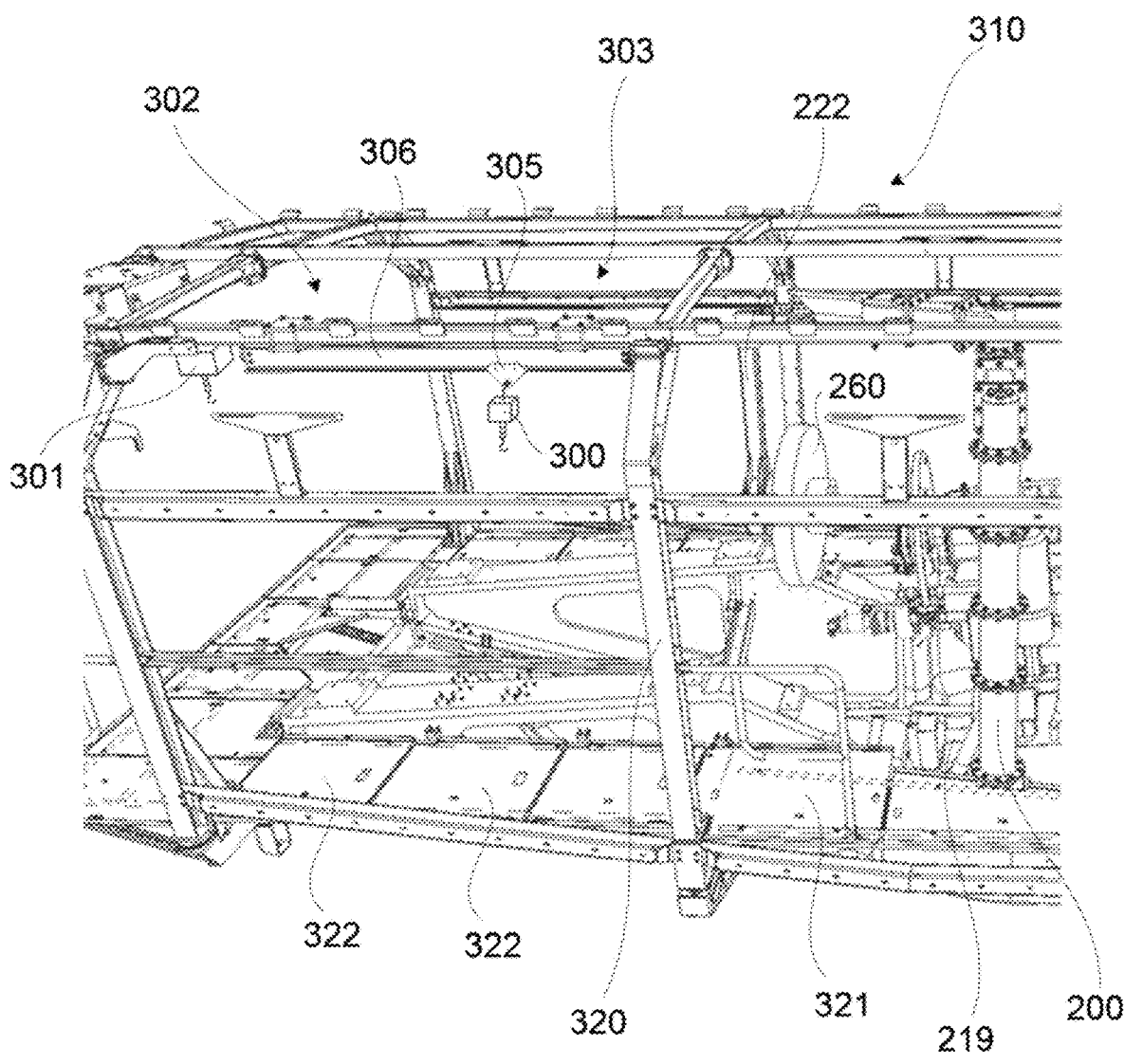
FIG. 11 is a schematic view of a maintenance system according to an embodiment in an installed state.

The nacelle 106 includes a nacelle opening 109. In particular, the nacelle opening 109 is formed in the bottom of the nacelle 106 in a nacelle floor 321 (FIG. 11). The nacelle opening 109 is configured such that a component 260 (for example FIG. 2) can be moved into and moved out of the nacelle 106. For example, the nacelle opening 109 can be a hatch opening covered by one or more hatch panels 322 (FIG. 11).

FIGS. 2 to 5 each show a modular jib crane 200 according to different embodiments. The modular jib crane 200 is configured to be arranged inside the nacelle 106 to move the component 260 inside the nacelle. For example the component 260 is to be installed or replaced during maintenance. The crane 200 is configured to carry the component 260.

The crane 200 includes a base element 201. The base element 201 is configured to be connected to a support structure 219 inside the nacelle. The support structure 219 for example is a machine frame which is rotatably connected to the tower 102. According to further embodiments, the support structure 219 is a generator frame connected to the machine frame. The support structure 219 for example is also configured to support a nacelle housing support structure 320 (FIG. 11).

The base element 201 is rigidly fixed to the support structure 219 for example by screws. The support structure 219 and the base element 201 in particular are not movable with respect to each other in a coupled state. In particular no rotation between the base element 201 and the support structure 219 is possible. The base element 201 is rigidly connected to the support structure 219.

The base element 201 is designed and configured to match the specific support structure 219 of the nacelle 106. Different kinds of support structures 219 and nacelles 106 can be used. For each type of support structure 219 a specific corresponding base element 201 is provided. The base element 201 fits the support structure 219. The base element 201 serves as an interface between the support structure 219 and a pillar 202 of the crane 200. Thus, the pillar 202 can be used with different kinds of support structures 219 because the base element 201 provides the corresponding interface.

The pillar 202 includes a plurality 209 of pillar modules 210. In particular, the pillar 202 can have one, two, three, four or more pillar modules 210. The pillar modules 210 are stacked along a longitudinal axis 218 of the pillar 202 and coupled with one another, for example via a flange connection. The pillar modules 210 can for example have a square tubular shape or a round tubular shape. The pillar modules 210 can be of the same kind or of a different kind. The pillar modules 210 may be of different sizes, in particular of different lengths. Thus, a pillar with a desired size can be built by stacking a specific number of pillar modules 210 of specific size(s). Thus, the crane 200 can be formed with the pillar 202 that fits the specific nacelle 106.

Along the longitudinal axis 218 of the pillar 202 a first end 203 of the pillar 202 is coupled to the base element 201. An opposing second end 204 of the pillar 202 is coupled with a first crane arm 206.

The first crane arm 206 includes a plurality 209 of first crane arm modules 211. In particular, the first crane arm 206 includes one, two, three, four or more first crane arm modules 211. The first crane arm modules 211 can for example have a square tubular shape or a round tubular shape. The first crane arm modules 211 are of the same kind or of different kinds. The first crane arm modules 211 may be of different sizes, in particular of different lengths. The crane arm modules 211 are coupled with each other along a planar surface 217, for example via a flange connection. The planar surface 217 is oriented perpendicular to the longitudinal axis 218 of the pillar 202. The first crane arm 206 is oriented perpendicular to the pillar 202. A specific number of first crane arm modules 211 of specific length(s) is connected to each other to form the first crane arm 206 with a desired length.

Along the longitudinal direction of the first crane arm 206 the first crane arm 206 is coupled with the pillar 202 at a first end 207 of the first crane arm 206.

Figure 2:
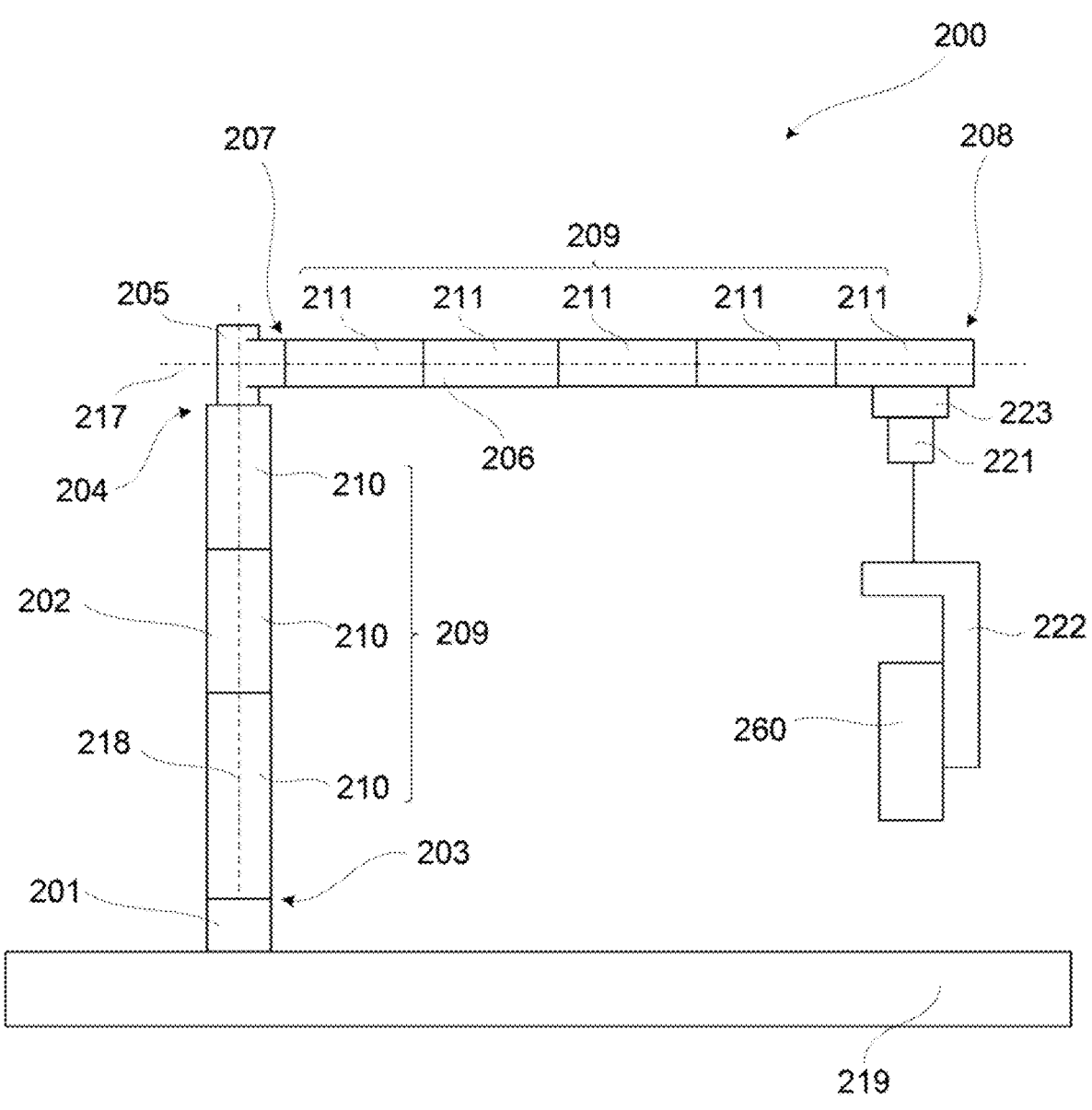
FIGS. 2 to 5 are schematic views of a modular jib crane according to embodiments.
Figure 3:
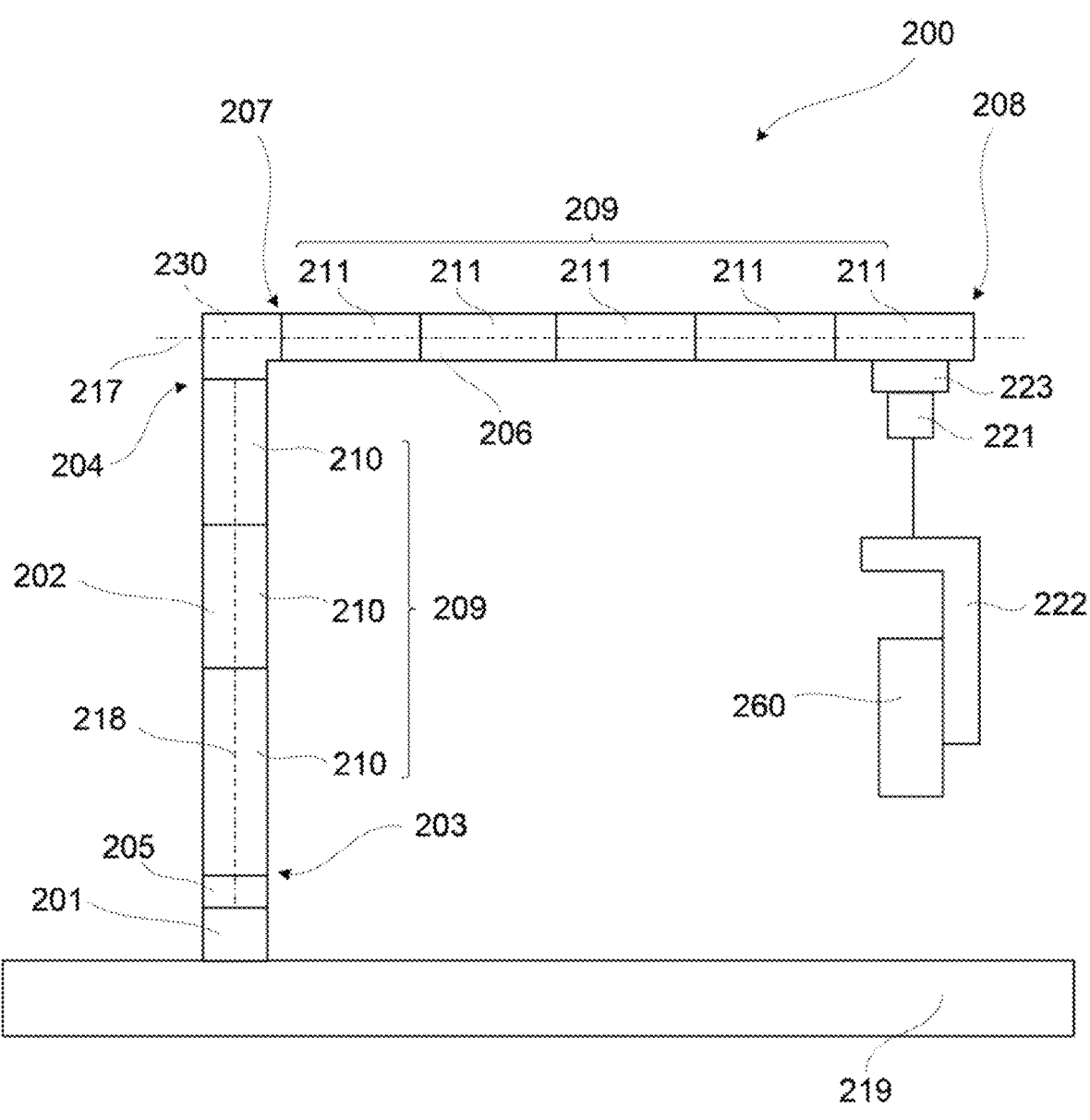
Figure 4:
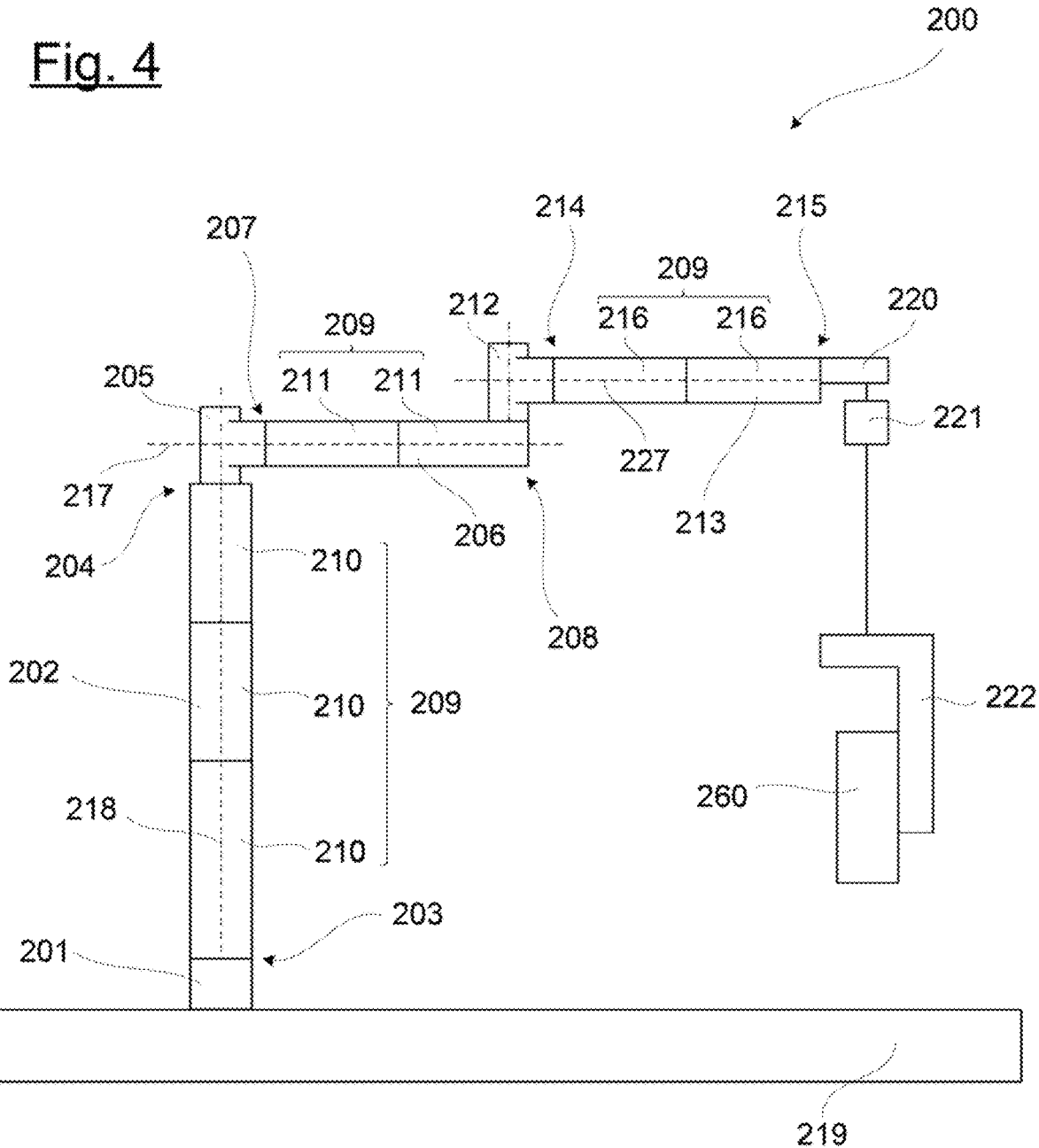
Figure 5:
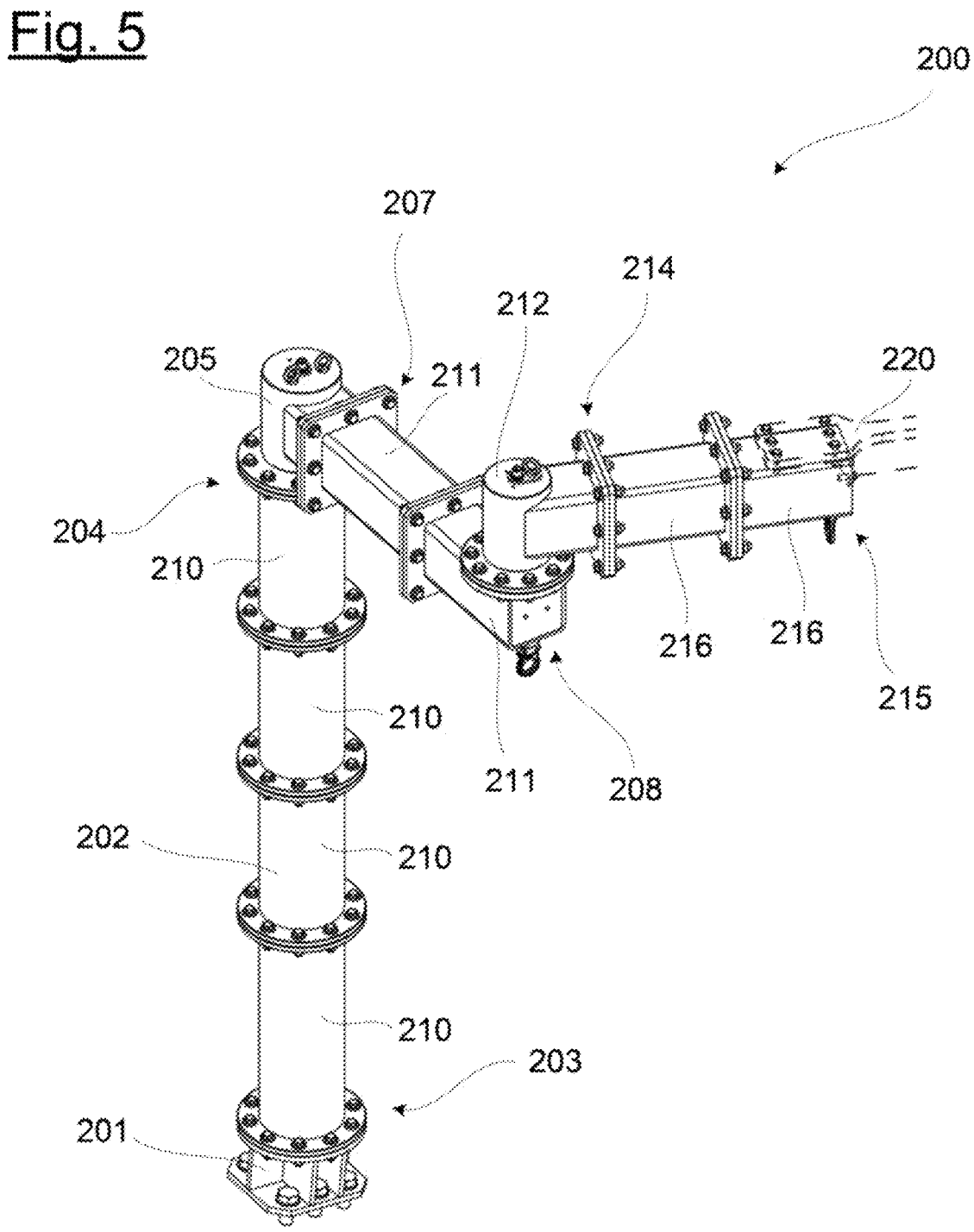

According to the embodiments of FIGS. 4 and 5 a second crane arm 213 is coupled with a second end 208 of the first crane arm. As shown in FIGS. 2 and 3 the second crane arm 213 can be omitted.

According to embodiments, the second crane arm 213 includes a plurality 209 of second crane arm modules 216. The second crane arm modules 216 can for example have a square tubular shape or a round tubular shape or cylindrical shape. The second crane arm modules 216 can be of the same kind or of different kinds. The second crane arm modules 216 can be of the different sizes, in particular of different lengths. One, two or more second crane arm modules 216 can be coupled with each other, for example via a flange connection, to form the second crane arm 213 with a desired length. The second crane arm 213 is coupled with the first crane arm 206 at a first end 214 of the second crane arm 213. On an opposing second end 215 of the second crane arm 213 a connection element 220 can be coupled.

To allow the component 260 which should be moved by the crane 200 to be moved with a high flexibility inside the nacelle 106, the first crane arm 206 and/or the second crane arm 213 are movable, in particular rotatable, in the planar surface 217 with respect to the support structure 219.

According to the embodiments of FIG. 2, FIG. 4 and FIG. 5 a first pivot joint 205 is arranged between the pillar 202 and the first crane arm 206. The first pivot joint allows a rotation of the first crane arm 206 with respect to the pillar 202 around the longitudinal axis 218 of the pillar 202. The pillar 202 is not rotatable with respect to the support structure 219 or the base element 201.

According to the embodiment of FIG. 3 the first pivot joint 205 is arranged between the pillar 202 and the base element 201. The first crane arm 206 and the pillar 202 are coupled to each other via an intermediate element 230. The intermediate element 230 for example includes a rigid element like an elbow. The pillar 202 is rotatable around the longitudinal axis 218 of the pillar 202 with respect to the base element 201 and the support structure 219. The first crane arm 206 and the pillar 202 are not rotatable with respect to each other.

According to the embodiments of FIGS. 4 and 5 a second pivot joint 212 is arranged between the first crane arm 206 and the second crane arm 213. The second pivot joint 212 allows a rotation of the second crane arm 213 with respect to the first crane arm 206 in a planar surface 227 of the second crane arm 213. Thus the first crane arm 206 is pivotable with respect to the pillar 202 and the second crane arm 213 is pivotable with respect to the first crane arm 206 and the pillar 202. Thereby, a high flexibility for moving the component 260 is possible.

The first pivot joint 205 and the second pivot joint 212 may be of the same size or of different sizes. Each of the pivot joints 205, 212 may for example include a pivot joint shaft coupleable with a module 209 via a flange connection, a pivot joint bearing housing coupleable with another module 209 via a flange connection, and a bearing arrangement for rotatably connecting the pivot joint shaft with the pivot joint bearing housing.

According to the embodiments of FIGS. 2 and 3 a crane trolley 223 is arranged on the first crane arm 206. The crane trolley 223 is movable along the first crane arm 206. The crane trolley 223 is supported by the crane arm 206. A crane hoist 221 is coupled with the crane trolley 223. The crane hoist 221 can lift and lower the component 260. For example a specific load lifting tool 222 is used to couple the crane 200 with the component 260. In particular, the load lifting tool 222 is specifically configured to be connected to a specific component 260. According to further embodiments, the load lifting tool 222 may be omitted and the component 260 can be coupled directly to the crane hoist 221.

According to the embodiments of FIGS. 4 and 5 a connection element 220 is connected to the second end 215 of the second crane arm 213. The connection element 220 can also be omitted. The connection element 220 increases the range of the crane 200 and serves as a mounting interface for the crane hoist 221.

Figure 6:
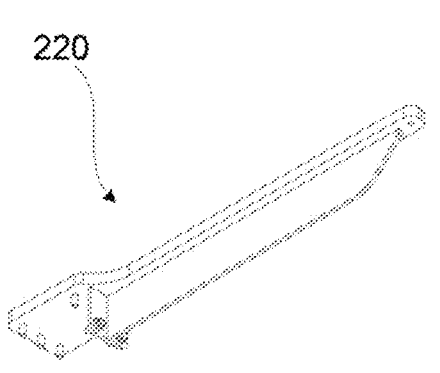
FIG. 6 is a schematic view of a connection element according to an embodiment.

FIG. 6 shows a schematic view of the connection element 220 according to an embodiment. The connection element 220 may be configured differently according to further embodiments.

Figure 7:
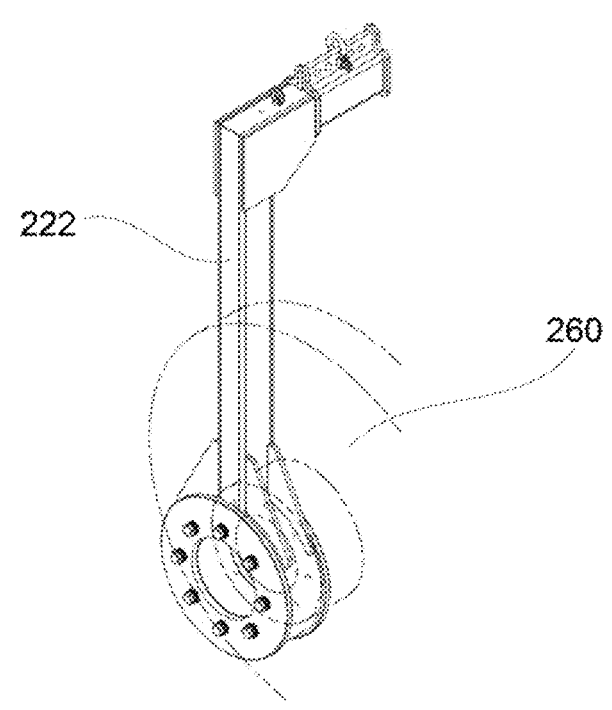
FIG. 7 is a schematic view of a load lifting tool according to an embodiment.

FIG. 7 shows a schematic view of an embodiment of the load lifting tool 222. According to further embodiments, the load lifting tool 222 may be configured differently. The load lifting tool 222 according to the embodiment of FIG. 7 for example serves to be connected and to move a part of the gearbox of the wind turbine 100, in particular the gearbox low-speed shaft.

Figure 8:
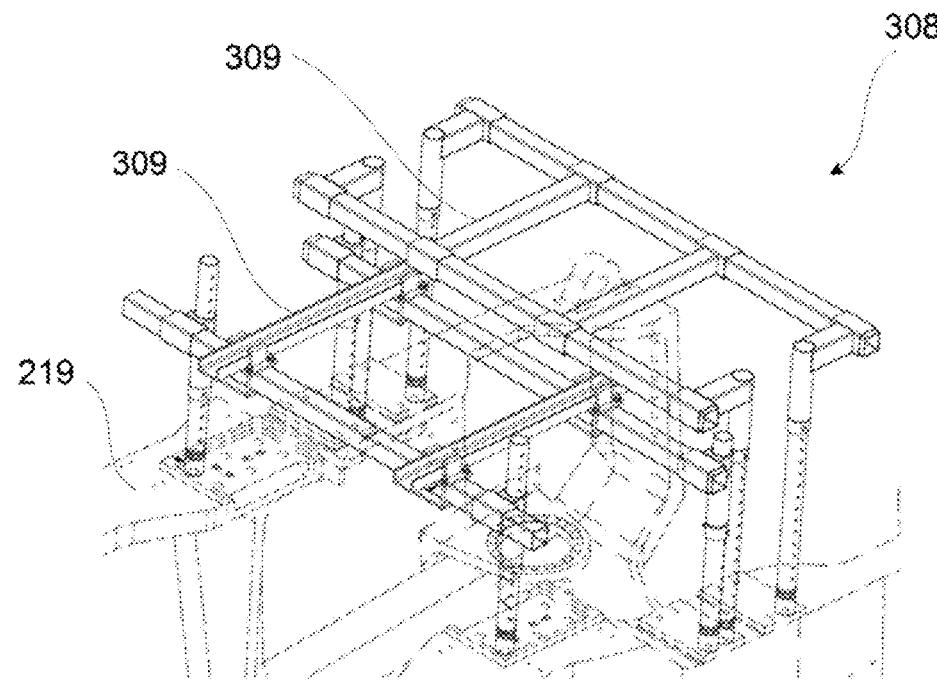
FIG. 8 is a schematic view of a support tool according to an embodiment.

FIG. 8 schematically shows a support tool 308 according to an embodiment. For example, the support tool 308 is used to serve as a train for components inside the nacelle. The support tool 308 can be omitted, in particular if there is enough space in the nacelle to store elements for example on the floor of the nacelle.

The support tool 308 includes different storage areas 309 for temporary storage of elements for example during installation or maintenance of the drive train or other parts of the nacelle 106. In particular, the support tool 308 may be used to store elements which need to be removed in order to reach the component 260, such as a gearbox cover or cooling devices. The storage areas 309 are in particular aligned along horizontal planes on different levels.

Figure 9:
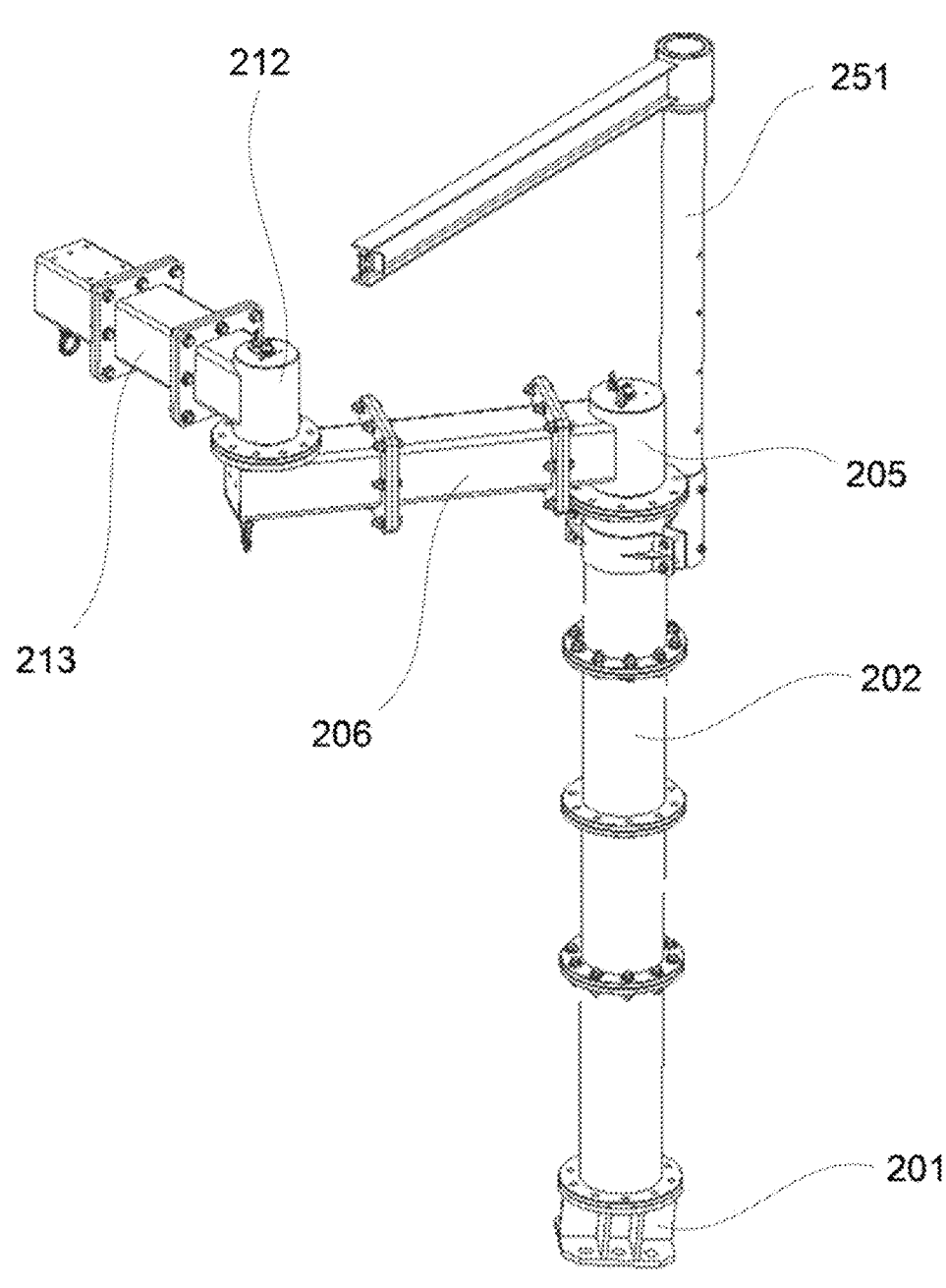
FIG. 9 is a schematic view of a modular jib crane with an add-on crane according to an embodiment.

FIG. 9 shows a further embodiment of the crane 200 and an add-on crane 251. The add-on crane 251 can be fixed to the pillar 202. For example, the add-on crane 251 is coupled to the uppermost pillar module 210 as shown in FIG. 9. According to further embodiments, the add-on crane 251 is coupled to another one of the pillar modules 210 for example in a middle region of the pillar 202 or at the lowest pillar module 210.

The add-on crane 251 is configured to move at least one of the modules 209 during installation or dismantling of the crane 200. For example, first crane arm modules 211 and/or second crane arm modules 216 are lifted or lowered with the aid of the add-on crane 251 to simplify assembly and disassembly of the crane 200.

As shown in FIG. 9, the add-on crane 251 may include a vertical pillar and a horizontal arm. Other kinds and configurations of the add-on crane 251 are possible.

Figure 10:
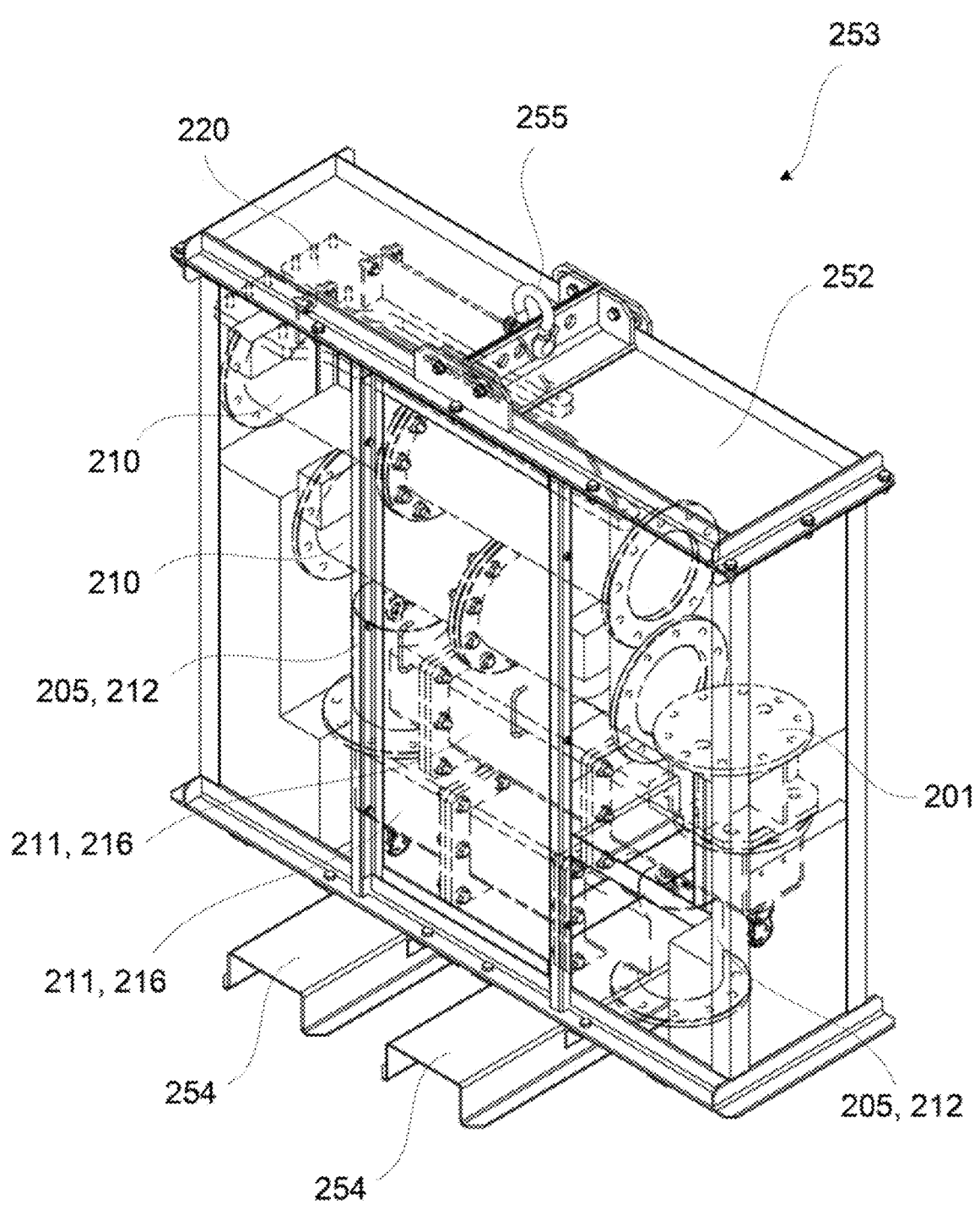
FIG. 10 is a schematic view of a transport system according to an embodiment.

FIG. 10 shows a schematic view of a transport system 253. The transport system 253 serves to transport the modular jib crane 200 in a disassembled state. The modular jib crane 200 can be transported in a space saving way with the transport system 253, for example on a ship or on a truck. The modular jib crane 200 is easily movable to the nacelle 106 when stored in the transport system 253.

The transport system 253 includes a basket 252. The basket is designed and configured to hold and store the elements of the jib crane 200, in particular the base elements 201, the plurality 209 of modules and the crane hoist 221. According to further embodiments, the connection element 220 and/or the add-on crane 251 are also storable inside the basket 252. In particular, all elements needed for the operation of the crane 200 are storable inside the one single basket 252 to simplify transportation of the crane 200, in particular the transportation to/from the location of the wind turbine 100 as well as between the ground 105 and the nacelle 106. The elements storable inside the one single basket 252 may also include the first pivot joint 205 and/or the second pivot joint 212 where applicable.

The basket 252 includes a transport interface 254. For example, the transport interface 254 is configured to be coupled with a fork lift. In particular the transport interface 254 can be dismounted from the basket 252 before the basket 252 is lifted to the nacelle 106.

The basket 252 includes a coupling interface 255. The coupling interface 255 can be coupled to a hoist to lift and lower the basket 252 along the tower 102 between the ground 105 and the nacelle 106.

As shown in FIG. 10 some of the modules 209 can be preassembled when stored in the basket 252. This depends on the size of the basket 252 and the size of the modules 209. For example the first pivot joint 205 is preassembled with one of the first crane arm modules 211. For example, the second pivot joint 212 is preassembled with one of the second crane arm modules 216. For example two or more of the pillar modules 210 are preassembled.

FIG. 11 shows a nacelle housing support structure 320 which is arranged inside the nacelle 106 according to an embodiment. The nacelle housing support structure 320 includes several beams which support the nacelle housing. This structure 320 may also support other components such as the nacelle floor 321 as well as components attached to the nacelle housing. In particular, the nacelle housing support structure 320 is supported by the support structure 219. In FIG. 11, some components which are normally present in the nacelle 106 are not explicitly shown for clarity reasons.

The nacelle floor 321 includes the nacelle opening 109. The nacelle opening 109 may in particular be a hatch opening covered by the one or more hatch panels 322.

A maintenance system 310 is arranged inside the nacelle housing support structure 320. The maintenance system 310 is configured to move the component 260 inside the nacelle 106 and through the nacelle opening 109 between the nacelle 106 and the ground 105.

According to embodiments, the maintenance system 310 includes a crane of the type of the modular jib crane 200 as described herein. According to further embodiments the maintenance system 310 includes a different type of crane, for example a crane which is permanently installed and always present in the nacelle 106.

The maintenance system 310 includes a carrying system 302. The carrying system 302 is configured to move the component 260 between the crane 200 and the nacelle opening 109. In particular, the carrying system 302 is configured to move the component 260 inside the nacelle along a horizontal direction.

Figure 14:
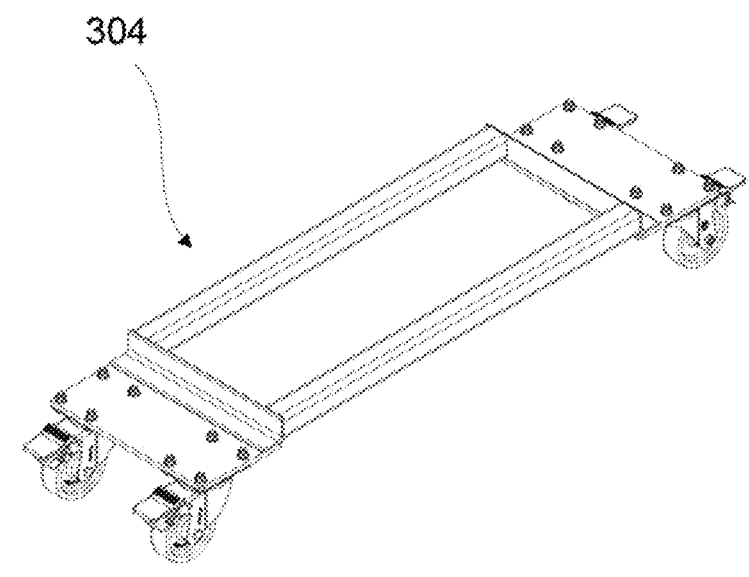
FIG. 14 is a schematic view of a nacelle trolley according to an embodiment; and, FIGS. 15 to 17 are flow charts of methods.

For example, the carrying system 302 includes a rail system 303 as shown in FIG. 11. According to further embodiments, the carrying system 302 alternatively or in addition includes a nacelle trolley 304 as shown in FIG. 14.

The rail system 303 includes one or more rail beams 306 which are coupled to the support structure 320, next to the on-board hoist 301 (schematically illustrated in FIG. 11). A rail trolley 305 is guided by the rail beam 306 and movable with respect to the rail beam 306 along the rail beam 306. A high-capacity hoist 300 (which is schematically illustrated in FIG. 11) is coupled to the rail trolley 305. The high-capacity hoist 300 is movable inside the nacelle 106 by the rail trolley 305 and the rail beam 306. According to embodiments, the high-capacity hoist 300 is of the type of an electric chain hoist. In this embodiment, a chain box 307 for storing the hoist chain is coupled to the rail trolley 305 (not explicitly shown in FIG. 11).

The nacelle trolley 304 is movable on wheels on the nacelle floor 321. The component 260 can be placed on the trolley and the trolley can be moved around on the nacelle floor 321. The nacelle trolley 304 is meant to move freely on the nacelle floor. According to further embodiments, the nacelle trolley 304 is guided by a rail on the nacelle floor 321.

The component 260 can be indirectly coupled to the high-capacity hoist 300, namely via the lifting tool 222 illustrated in FIGS. 7 and 11. Alternatively, the component 260 can be directly coupled to the high-capacity hoist 300, without any lifting tool 222 there between. When the component 260 is coupled to the high-capacity hoist, the component 260 is movable along a horizontal direction along the rail beam 306. Furthermore, the component 260 is movable along the vertical direction along the tower 102 with the aid of high-capacity hoist 300.

Figure 12:
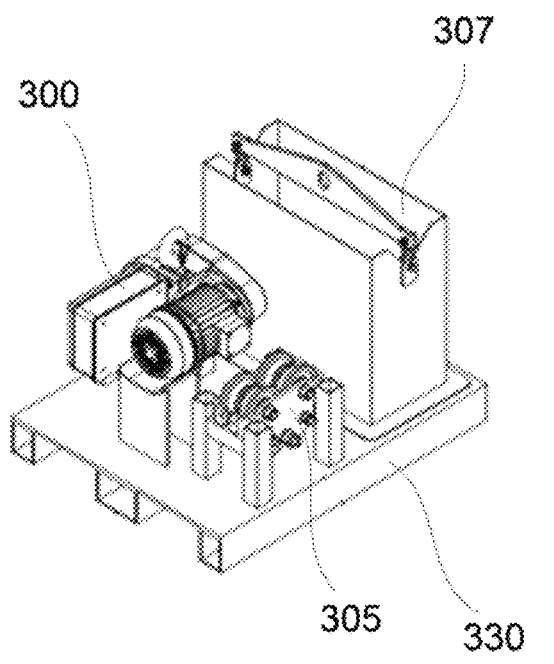
FIG. 12 is a schematic view of a hoist with a hoist transport platform according to an embodiment.
Figure 13:
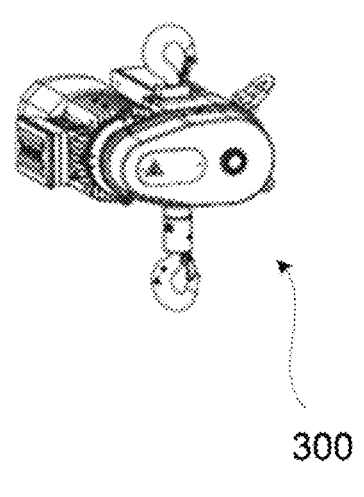
FIG. 13 is a schematic view of a high-capacity hoist according to an embodiment.

FIG. 12 shows the high-capacity hoist 300 in a stored state. The high-capacity hoist 300, which is also represented in FIG. 13, is stored on a hoist transport platform 330. A chain box 307 is provided on the hoist transport platform 330 to store the chain which belongs to the high-capacity hoist 300. The rail trolley 305 may also be stored on the hoist transport platform 330. Thus, comparable to the transport system 253, a simple transport of the high-capacity hoist 300 in corresponding components is possible.

Figure 15:
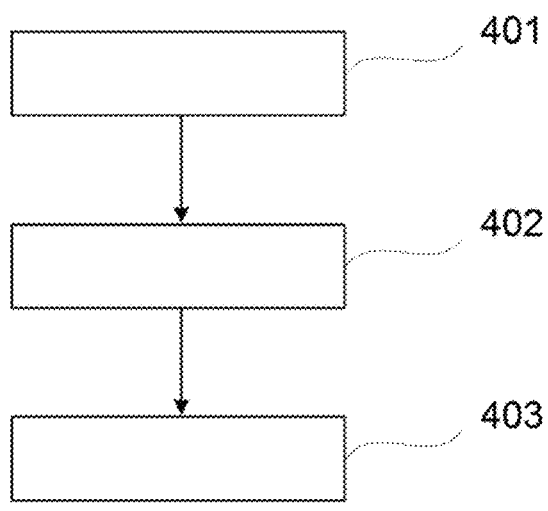

FIG. 15 shows a flow chart of a method for installing the modular jib crane 200.

In a step 401 the high-capacity hoist 300 is lifted to the nacelle 106 with an on-board hoist 301. The on-board hoist includes a lower weight capacity than the high-capacity hoist 300. The on-board hoist 301 is for example permanently installed within the nacelle 106. The high-capacity hoist 300 is coupled with the nacelle housing support structure 320. For example, the high-capacity hoist 300 is connected to the carrying system 302 as shown in FIG. 11.

In a step 402 the transport system 253 is lifted from the ground 105 to the nacelle 106 with the high-capacity hoist 300. Due to the higher weight capacity of the high-capacity hoist 300 the basket 252 with all the elements to assemble the modular jib crane 200 can be lifted at once.

In a step 403 the basket 252 is unpacked inside the nacelle 106 and the plurality 209 of modules is assembled to build the crane 200 inside the nacelle 106. The dismantling of the crane 200 is done in reverse order.

Figures 16, 17:
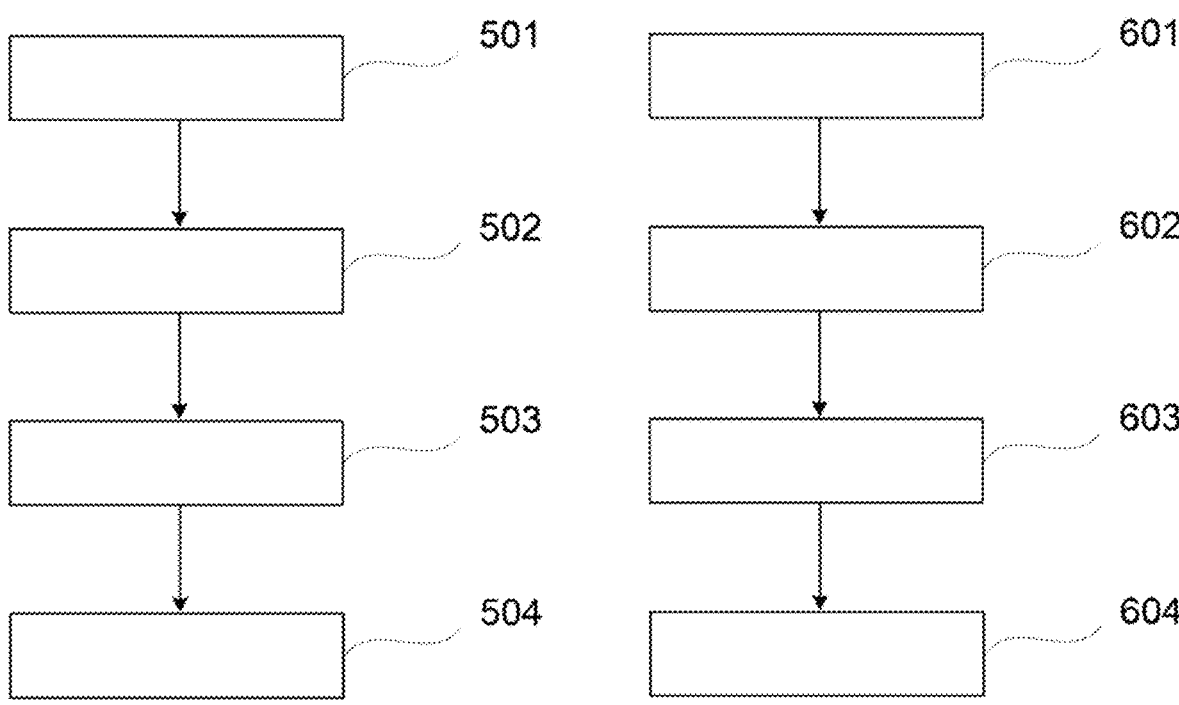

FIG. 16 shows a flow chart of a method for maintenance of the nacelle 106. In particular, the method uses the maintenance system 310 as shown in FIG. 11. According to further embodiments the maintenance method uses a different maintenance system.

In a step 501 the component 260 is moved with the crane 200. For example, the component 260 is moved from an intended place of use or towards the intended place of use. For example, the component 260 is a damaged component that needs to be exchanged or the component 260 is the new component that replaces the damaged component.

In a step 502 the component 260 is moved inside the nacelle 106 with the carrying system 302. With the carrying system 302 the component 360 is moved between the crane 200 and the nacelle opening 109. For example, the component 260 is transferred between the crane 200 and the carrying system 302 before or after moving the component 260 within the nacelle 106. This is, for example, done in a step 503.

The order of the steps 502 and 503 can be changed dependent on whether the damaged component 260 should be moved towards the nacelle opening 109 and lowered towards the ground 105 or whether the new component 260 should be moved towards its intended place by the crane 200.

In step 504 the high-capacity hoist 300 is operated to move the component through the nacelle opening 109 and along the tower 102 of the wind turbine 100. For example, the high-capacity hoist 300 is operated to lower that component 260 through the nacelle opening 109 towards the ground. For example, the high-capacity hoist 300 is operated to lift the component 260 from the ground to the nacelle 106. In this case, step 504 is the first method step of the method for maintenance of the nacelle 106.

FIG. 17 shows a floor chart of a method for installing the maintenance system 310.

In a step 601 a carrying system 302 is provided inside the nacelle 106. For example, the carrying system 302 is permanently installed inside the nacelle 106. According to further embodiments, the carrying system 302 is lifted to the nacelle with the on-board hoist 301 or with the high-capacity hoist 300. Afterwards, the carrying system 302 is installed inside the nacelle 106. For example, the rail beam 306 is screwed to the nacelle housing support structure 320.

In a step 602, which can be carried out before or after step 601, the high-capacity hoist 300 is lifted to the nacelle 106 with the on-board hoist 301. For example, the high-capacity hoist is installed on the rail system 303 of the carrying system 302.

In a step 603 the crane 200 or a different crane is lifted in a disassembled state to the nacelle 106 with the high-capacity hoist 300. The high-capacity hoist 300 is strong enough to lift the basket 252 along the tower 102. The crane is movable inside the nacelle 106 with the aid of the carrying system 302 between the nacelle opening 109 and an intended place of use of the crane 200.

In a step 604 the crane 200 is assembled and brought into one operational condition.

The dismantling of the maintenance system 310 takes place in reverse order. The sequence of the method steps of each of the methods according to FIG. 15, FIG. 16 and FIG. 17 can also be different to the ones described above, depending on whether transport is to take place in the direction from the ground to the nacelle or the other way around.

The modular jib crane 200 according to the different embodiments allows a high load capacity of more than 500 kg, in particular of more than 800 kg. Thus the modular jib crane 200 can carry heavier drive train components 260. In the embodiment in which the modular jib crane 200 includes the first crane arm 206 and the second crane arm 213 high flexibility and efficiency of the movement is realized. The crane 200 is segmented into the standard modules 210, 211 and/or 216. These are useable in different kinds of nacelles

106. The modules 209 are assembled together to form the crane. An increased modularity is possible, which enables the customization of the shape of the crane 200 depending on the space available within the nacelle 106 and on the necessary reach of the crane 200 within the nacelle 106.

The base element 201 which is fixed to the support structure 219 is configured according to the specific support structure 219 which it should fit. Thus the standard modules of the crane 200 can be used with different kinds of support structures 219.

According to embodiments, the modular jib crane 200 works together with the high-capacity hoist 300 and/or the carrying system 302. The crane 200 serves to lift or lower the component 260 and to move the component between its intended place of use and the carrying system 302 and/or the high-capacity hoist 300. The high-capacity hoist 300 is configured to lift or lower the component 260 or any other load through the nacelle opening 109 and along the tower 102.

With the aid of the add-on crane 251 technicians do not need to carry all of the components to assemble or disassemble the crane 200 by themselves. The weight of the components can be lifted and moved by the add-on crane 251.

In particular a conventional telescopic crane can be avoided and a dismantling of the nacelle roof can also be avoided. Thus, the complexity and the costs of maintenance or installation are significantly reduced. All elements of the crane 200 and additionally needed elements can be arranged in the single basket 252 and carried on a single pallet. This helps to improve logistics. A telescopic crane reaching the nacelle 106 from the ground 105 is no longer needed.

In particular it is possible to use the modular jib crane 200 according to embodiments with or without the described nacelles. Accordingly, it is also possible to use the described nacelles and also the described maintenance system with or without the modular jib crane 200 described herein.

Overall, flexibly useable crane embodiments, crane kit embodiments, transport system embodiments, maintenance system embodiments and different methods are provided which allow movement of heavy loads, modular use and simple transportation and storage.

It is understood that the foregoing description is that of the preferred embodiments of the invention and that various changes and modifications may be made thereto without departing from the spirit and scope of the invention as defined in the appended claims.

REFERENCE SIGNS 100 wind turbine
102 tower
104 foundation
105 ground
106 nacelle
108 rotor
109 nacelle opening
110 rotor blade
112 rotor hub
200 modular jib crane
201 base element
202 pillar
203 first end of the pillar
204 second end of the pillar
205 first pivot joint
206 first crane arm
207 first end of the first crane arm 208 second end of the first crane arm
209 plurality of modules
210 pillar module
211 first crane arm module
212 second pivot joint
213 second crane arm
214 first end of the second crane arm
215 second end of the second crane arm
216 second crane arm module
217 planar surface of the first crane arm
218 longitudinal axis of the pillar
219 support structure inside the nacelle
220 connection element
221 crane hoist
222 load lifting tool
223 crane trolley
227 planar surface of the second crane arm
230 intermediate element
251 add-on crane
252 basket
253 transport system
254 transport interface
255 coupling interface
260 component
300 high-capacity hoist
301 on-board hoist
302 carrying system
303 rail system
304 nacelle trolley
305 rail trolley
306 rail beam
307 chain box
308 support tool
309 storage area
310 maintenance system
320 nacelle housing support structure
321 nacelle floor
322 hatch panel
330 hoist transport platform
401-403 method steps
501-504 method steps
601-604 method steps

The invention claimed is:

1. A modular jib crane kit for assembling a modular jib crane having a base element for attaching the crane to a nacelle, a pillar, a first crane arm, and a second crane arm, the pillar being couplable with the base element at a first end of the pillar, and, the first crane arm being couplable with the pillar at a first end of the first crane arm, the modular jib crane kit comprising:

a multitude of base elements, wherein each of said multitude of base elements is configured to mate with a different nacelle configuration;

a plurality of pillar modules configured to form different types of the pillar in dependence upon the nacelle configuration;

at least one of a plurality of first crane arm modules and a plurality of second crane arm modules configured to form different types of at least one of the first crane arm and the second crane arm in dependence upon the nacelle configuration; and, an add-on crane, wherein said add-on crane is coupleable with the pillar and is configured to move at least one of said plurality of pillar modules, said plurality of first crane arm modules, and said plurality of second crane arm modules during assembly of the crane.

2. The modular jib crane kit of claim 1 further comprising:
a first pivot joint, wherein said first pivot joint is coupleable with said pillar at a second end of said pillar; and,
said first crane arm being coupleable with said pillar at said first end of said first crane arm via said first pivot joint such that said first crane arm is pivotable relative to said pillar in a coupled state.

3. The modular jib crane kit of claim 1 further comprising:
a second pivot joint, wherein the second pivot joint is coupleable with said first crane arm at a second end of said first crane arm;
a second crane arm, wherein the second crane arm is coupleable with said first crane arm at a first end of said second crane arm via said second pivot joint such that said second crane arm is pivotable relative to said first crane arm in a coupled state; and,
wherein at least one of said pillar, said first crane arm and said second crane arm includes said plurality of modules coupleable with each other to form said pillar, said first crane arm, or said second crane arm.

4. The modular jib crane kit of claim 3, wherein said plurality of modules are at least one of identical, of an identical geometry with differing dimensions, and identical except for different coupling faces or lack of coupling faces.

5. The modular jib crane kit of claim 3 further comprising:
a first pivot joint, wherein said first pivot joint is coupleable with said pillar at a second end of said pillar;
said first crane arm being coupleable with said pillar at said first end of said first crane arm via said first pivot joint such that said first crane arm is pivotable relative to said pillar in a coupled state; and,
at least one of said first pivot joint and said second pivot joint being rotatable with respect to a planar surface whose normal direction is aligned with a longitudinal axis of said pillar.

6. The modular jib crane kit of claim 1, wherein said base element is configured to be attached to a support structure inside said nacelle.

7. A transport system for the modular jib crane of claim 1, the transport system comprising a single basket which is configured to carry the plurality of modules.

8. The transport system of claim 7, wherein said single basket is configured to additionally carry the add-on crane.

* * * * *